United States Patent
Kim et al.

(10) Patent No.: US 10,349,534 B2
(45) Date of Patent: Jul. 9, 2019

(54) DISPLAY APPARATUS

(71) Applicant: SAMSUNG ELECTRONICS CO., LTD., Suwon-si (KR)

(72) Inventors: Byoung Jung Kim, Jeollabuk-do (KR); Byung Joo Paek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 440 days.

(21) Appl. No.: 14/919,173

(22) Filed: Oct. 21, 2015

(65) Prior Publication Data

US 2016/0120043 A1   Apr. 28, 2016

(30) Foreign Application Priority Data

Oct. 27, 2014   (KR) .................... 10-2014-0146105

(51) Int. Cl.
*B32B 3/26*   (2006.01)
*B32B 3/28*   (2006.01)
(Continued)

(52) U.S. Cl.
CPC ............. *H05K 5/0017* (2013.01); *B32B 5/02* (2013.01); *B32B 5/18* (2013.01); *B32B 5/22* (2013.01); *B32B 5/245* (2013.01); *B32B 5/26* (2013.01); *B32B 15/046* (2013.01); *B32B 27/12* (2013.01); *B32B 27/18* (2013.01); *B32B 27/302* (2013.01); *B32B 27/304* (2013.01); *G02F 1/133308* (2013.01); *B32B 3/263* (2013.01); *B32B 3/28* (2013.01); *B32B 7/12* (2013.01); *B32B 15/08* (2013.01); *B32B 15/14* (2013.01); *B32B 15/20* (2013.01); *B32B 27/32* (2013.01);
(Continued)

(58) Field of Classification Search
CPC .... B32B 5/02; B32B 5/18; B32B 5/22; B32B 5/245; B32B 5/26; B32B 15/046; B32B 27/12; B32B 27/18; B32B 27/302; B32B 27/304
USPC ....................................... 362/97.1
See application file for complete search history.

(56) References Cited

U.S. PATENT DOCUMENTS 4,267,221 A  *  5/1981  Ishikawa ................... E04C 2/30
                                                    428/121
4,403,010 A  *  9/1983  Festag ..................... B32B 15/08
                                                    428/200
(Continued)

FOREIGN PATENT DOCUMENTS

CA    2819229 A1   6/2012
EP    0019835 A1   5/1980
(Continued)

OTHER PUBLICATIONS

Extended European Search Report dated Jan. 5, 2016 in related European Patent Application No. 15191309.2 (7 pages).
(Continued)

*Primary Examiner* — Bryon T Gyllstrom
(74) *Attorney, Agent, or Firm* — Staas & Halsey LLP

(57) ABSTRACT

Disclosed herein is a display apparatus capable of implementing to be slim and lightweight. The display apparatus includes a display panel for displaying an image; a bottom chassis disposed in a rear of the display panel; and wherein the bottom chassis is formed with a panel including a plastic core and a planar material stacked on a side of the plastic core.

22 Claims, 14 Drawing Sheets

(51) Int. Cl.
   *B32B 5/02*   (2006.01)
   *B32B 5/18*   (2006.01)
   *B32B 5/22*   (2006.01)
   *H05K 5/00*   (2006.01)
   *G02F 1/1333* (2006.01)
   *B32B 5/24*   (2006.01)
   *B32B 5/26*   (2006.01)
   *B32B 15/04*  (2006.01)
   *B32B 27/12*  (2006.01)
   *B32B 27/18*  (2006.01)
   *B32B 27/30*  (2006.01)
   *B32B 7/12*   (2006.01)
   *B32B 15/08*  (2006.01)
   *B32B 15/14*  (2006.01)
   *B32B 15/20*  (2006.01)
   *B32B 27/32*  (2006.01)
   *B32B 27/36*  (2006.01)
   *B32B 27/40*  (2006.01)

(52) U.S. Cl.
   CPC ........... *B32B 27/365* (2013.01); *B32B 27/40* (2013.01); *B32B 2250/03* (2013.01); *B32B 2250/40* (2013.01); *B32B 2260/021* (2013.01); *B32B 2260/046* (2013.01); *B32B 2262/101* (2013.01); *B32B 2266/02* (2013.01); *B32B 2266/025* (2013.01); *B32B 2266/0228* (2013.01); *B32B 2266/0235* (2013.01); *B32B 2266/0264* (2013.01); *B32B 2266/0278* (2013.01); *B32B 2307/302* (2013.01); *B32B 2307/304* (2013.01); *B32B 2307/536* (2013.01); *B32B 2307/718* (2013.01); *B32B 2457/20* (2013.01); *B32B 2457/202* (2013.01); *G02F 2001/133314* (2013.01); *G02F 2202/022* (2013.01); *G02F 2202/16* (2013.01); *G02F 2202/28* (2013.01)

(56) References Cited

U.S. PATENT DOCUMENTS

| | | | | |
|---|---|---|---|---|
| 4,671,985 | A * | 6/1987 | Rodrigues | B29C 53/04 428/215 |
| 6,455,148 | B1 * | 9/2002 | Spears | B32B 5/18 428/315.5 |
| 7,222,977 | B1 * | 5/2007 | Darling | A63H 33/22 359/839 |
| 7,847,912 | B2 * | 12/2010 | Nishizawa | G02F 1/133305 349/158 |
| 8,147,086 | B2 * | 4/2012 | Tait | A45C 15/06 362/156 |
| 8,469,569 | B1 * | 6/2013 | Tunnicliffe | A63C 17/015 280/87.042 |
| 2007/0209317 | A1 * | 9/2007 | Jensen | B05D 7/14 52/834 |
| 2007/0242844 | A1 * | 10/2007 | Harman | H04R 19/02 381/191 |
| 2009/0123687 | A1 * | 5/2009 | Chakraborty | E04C 2/365 428/76 |
| 2009/0308521 | A1 * | 12/2009 | Monk | B32B 17/04 156/60 |
| 2012/0327324 | A1 | 12/2012 | Martisauskas et al. | |
| 2014/0009914 | A1 * | 1/2014 | Cho | G09F 9/35 362/97.3 |
| 2014/0133073 | A1 | 5/2014 | Ahn et al. | |
| 2014/0307474 | A1 | 10/2014 | Kim et al. | |

FOREIGN PATENT DOCUMENTS

| | | |
|---|---|---|
| EP | 0078174 A2 | 10/1982 |
| EP | 0115103 A1 | 1/1983 |
| EP | 2730968 A2 | 5/2014 |
| KR | 1020060095725 A | 9/2006 |
| KR | 1020060102007 A | 9/2006 |
| KR | 1020110133991 A | 12/2011 |
| KR | 10-2014-0043569 A | 4/2014 |

OTHER PUBLICATIONS

Form PCT/ISA/210 International Search Report dated Feb. 24, 2016 in related International Patent Application No. PCT/KR2015/011268 (3 pages).

European Communication dated May 11, 2018 in European Patent Application No. 15191309.2.

Daniel Gay, "Chapter 4—Sandwich Structures" In: "Composite Materials: Design and Applications", Third Edition, Jul. 2014, XP055472482, pp. 69-83.

* cited by examiner

DISPLAY APPARATUS

CROSS-REFERENCE TO RELATED APPLICATION

This application claims the benefit of Korean Patent Application No. 10-2014-0146105, filed on Oct. 27, 2014 in the Korean Intellectual Property Office, the disclosure of which is incorporated herein by reference.

BACKGROUND

1. Field

Embodiments of the present invention relate to a display apparatus.

2. Description of the Related Art

In general, display apparatuses include display modules which display images such as televisions and computer monitors.

Recently, the display apparatuses using the display modules including liquid crystal panels have been widely used.

Liquid crystal display apparatuses, which are commonly referred to as liquid crystal displays (LCDs), include liquid panels and backlight units, and one liquid panel and one backlight unit are generally packaged in a single module by a top chassis and a bottom chassis.

The liquid display apparatuses are applied to flat panel display apparatuses or curved display apparatuses. When the liquid crystal display apparatus is applied to the flat panel display apparatus, the bottom chassis thereof is required to maintain flatness in fabrication, and when the liquid crystal display apparatus is applied to the curved display apparatus, the bottom chassis is required to maintain a curvature formed in fabrication. Otherwise, the quality of images provided by the LCD apparatus is degraded.

However, when the strength of the bottom chassis is not sufficient to prevent deformation thereof, the bottom chassis can be deformed by its own weight, external forces, or heat. Therefore, solutions are required to provide sufficient strength to the bottom chassis thereof to prevent deformation.

As a method of reinforcing the strength of the bottom chassis, known methods, such as reinforcement by adding components for necessary portions thereof, formation of a beading structure on a side of the bottom chassis, or an increase in the robustness of the assembled structure, may be used. However, since there is a limitation for a beading structure only to reinforce the strength of the bottom chassis, as the size of the LCD apparatus is increase, it is more insufficient to prevent deformation of the bottom chassis.

Further, the above methods increase manufacturing costs, and also increase thicknesses and weights of the display apparatuses.

SUMMARY

Therefore, it is an aspect of the present invention to provide a display apparatus including the bottom chassis having a sandwich structure to which a plastic core is applied.

It is another aspect of the present invention to provide a display apparatus capable of implementing to be slim and light.

It is still another aspect of the present invention to provide a display apparatus capable of securing the strength and hardness of a bottom chassis of the display apparatus.

Additional aspects of the invention will be set forth in part in the description which follows and, in part, will be obvious from the description, or may be learned by practice of the invention.

In accordance with one aspect of the present invention, a display apparatus includes a display panel configured to display an image; and a bottom chassis disposed in a rear of the display panel; wherein the bottom chassis is formed with a sandwich panel including a plastic core, and a planar material stacked on an outer side of the plastic core.

The bottom chassis may be formed to have a size corresponding to at least a portion of a rear of the display panel.

The bottom chassis may be formed to have a size corresponding to a rear side of the display panel.

The planar material may include at least one of aluminum, steel, a metal, and a fiber composite material.

The plastic core may be a plastic material including at least one of a polypropylene, polycarbonate, polyethylene, polyurethane, polystyrene, and polyvinyl chloride.

The plastic core may be formed of a composite including at least one of the plastic material, glass fibers, and whiskers.

The sandwich panel may further include an adhesive or adhesive film for adhering between the planar material and the plastic core.

The sandwich panel may be processed by at least one method of adhesion, a jig and a thermal compression.

The display apparatus may further include a backlight unit provided so that light thereof is incident to the display panel, wherein the bottom chassis is provided to accommodate the backlight unit in a rear of the backlight unit.

The sandwich panel may include at least one shape of a plane shape and a curved shape.

The sandwich panel may include at least one of regions having different areas from each other, wherein the regions may be formed to be different thicknesses from each other.

In accordance with another aspect of the present invention, a display apparatus includes a display panel; a backlight unit configured to supply light to the display panel; and a bottom chassis disposed in a rear of the display panel so that the backlight unit is accommodated, wherein the bottom chassis is formed with at least one planar material having a conductive type, and a plastic core having a non-conductive type and stacked in the planar materials.

The bottom chassis may be formed to have a size corresponding to the display panel on the rear side of the display panel.

The planar material may include at least one of aluminum, steel, a metal, and a fiber composite material.

The plastic core may be formed to be a composite including at least one of a plastic material, glass fibers, and whiskers.

The sandwich panel further may include an adhesive or adhesive film for adhering between the planar material and the plastic core.

The sandwich panel may be processed by at least one method of adhesion, a jig or a thermal compression.

The sandwich panel may include a curved shape having a predetermined curvature to support the display panel in a curved state.

The sandwich panel in the curved shape may be formed so that a thickness thereof is gradually increased from both ends thereof toward a center thereof.

In accordance with still another aspect of the present invention, a display apparatus includes a display panel configured to display an image; a bottom chassis formed to have a size corresponding to at least a portion of a rear side of the display panel, wherein the bottom chassis includes a plastic core of a plastic material including at least one of polypropylene, polycarbonate, polyethylene, polyurethane, polystyrene, and polyvinyl chloride and a sandwich panel having a planar material stacked on an outer side of the plastic core.

The planar material may include at least one of aluminum, steel, a metal, and a fiber composite material.

The plastic core may be formed of a composite including at least one of a plastic material, glass fibers, and whiskers.

The sandwich panel further may include a fixing member for fixing between the planar material and the plastic core.

The sandwich panel further may include an adhesive or adhesive film for adhering.

The sandwich panel may be processed by at least one method of adhesion, a jig, and thermal compression.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments according to the present invention will be described with reference to accompanying drawings in detail.

Figure 1:
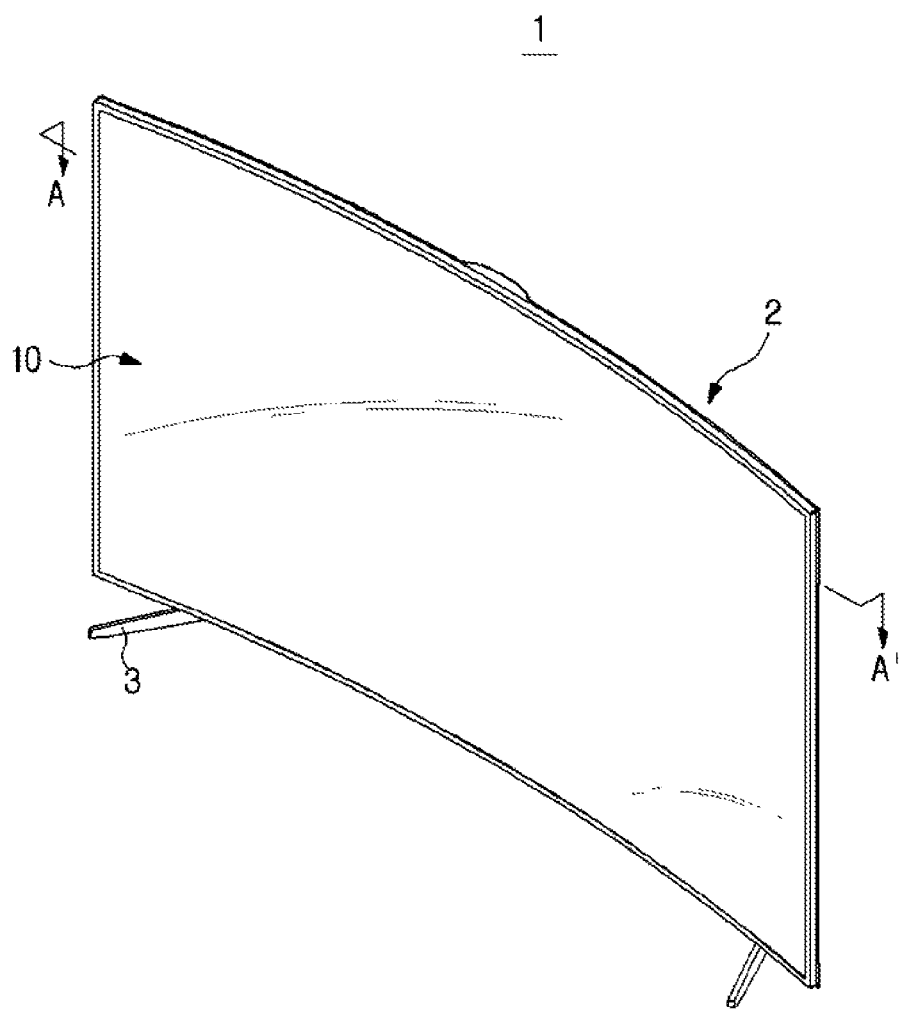
FIG. 1 is a schematic perspective view showing a display apparatus in accordance with an embodiment of the present invention.
Figure 2:
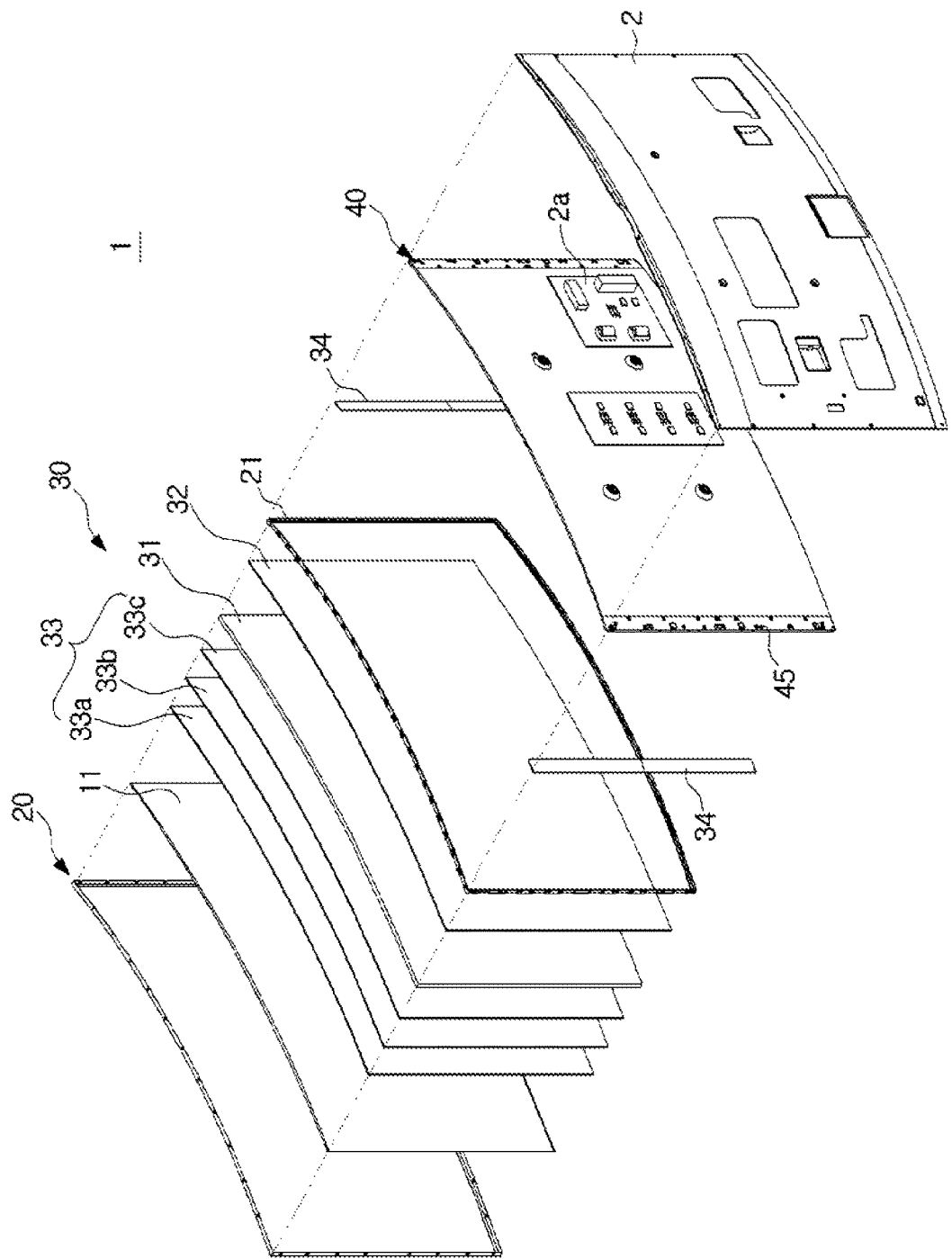
FIG. 2 is an exploded perspective view schematically illustrating the display apparatus in accordance with the embodiment of the present invention.

As shown in FIGS. 1 and 2, a display apparatus 1 includes a display module 10 for displaying image information, and a case 2 disposed on outer sides of the display module 10 and provided to protect the display module 10 and inside electrical components.

The display module 10 may be formed in a curved shape of which both ends protrude forward compared to a center position thereof to have a predetermined curvature.

The case 2 is disposed to cover the display module 10 in the rear of the display module 10. The case 2 may be detachably coupled with the display module 10.

In the inside of the case 2, a power supply unit (not shown) which supplies power required for driving the display module 10 and a driving circuit board 2a which converts external electrical signals into images and sound may be provided.

The driving circuit board 2a may be installed on a rear surface of the bottom chassis 40 which will be described below.

A base 3 supported by an installation surface, such as a floor, for installation of the display apparatus 1 is provided under the case 2, and the case 2 may be connected to the base 3 by a stand (not shown).

The display module 10 may include a self-emitting type display device that emits light by electrically exciting fluorescent organic compounds, such as an organic light emitting diode (OLED), and a light receiving display device, such as a liquid crystal display (LCD), which needs a separate light source.

The display module 10 may be configured to include a display panel 11, a backlight unit 30 separately disposed in the rear of the display panel 11 and provided so that light thereof is incident to the display panel 11, a middle mold frame 21 which supports the display panel 11 and the backlight unit 30 to be spaced apart from each other, a top chassis 20 disposed in front of the display panel 11, and the bottom chassis 40 disposed in the rear of the backlight unit 30.

The top chassis 20 may be formed in a rectangular ring shape, disposed on edges of a front surface of the display panel 11 and provided to support the front surface of the display panel 11.

Further, a light guide plate 31 which diffuses light radiated by the backlight unit 30, and the optical sheets 33 which enhance a characteristic of light passing through the light guide plate 31 are disposed between the display panel 11 and the backlight unit 30.

The optical sheets 33 may include a diffusion sheet 33c which diffuses again the light passed through the light guide plate 31, a prism sheet 33b that has a pattern in a prism form and collects the diffused light passed through the diffusion sheet 33c in a direction perpendicular to the display panel 11 disposed in front of the optical sheets 33, a protection sheet 33a that is disposed in front of the prism sheet 33b and protects the prism sheet 33b sensitive for scratching by dust, etc.

Figure 4:
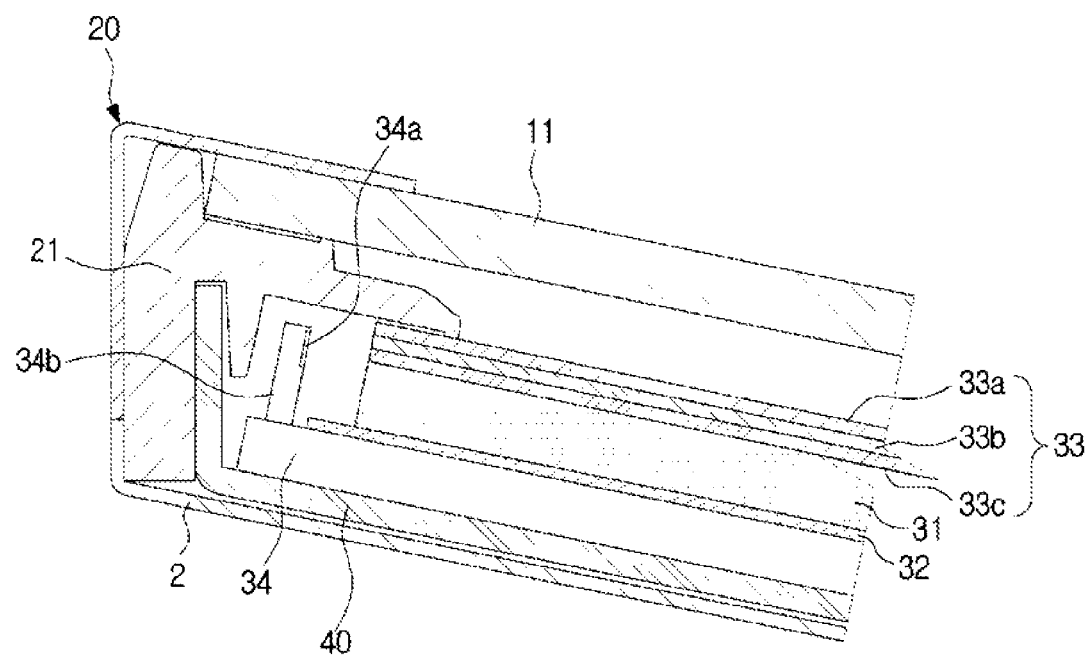
FIG. 4 is a cross sectional view taken along line A-A' of FIG. 1.

Meanwhile, as shown in FIG. 4, the backlight unit 30 includes a light emitting diode module 34 having a plurality of light emitting diodes 34a for applying light to the display panel 11.

At least one light emitting diode module 34 is provided and may be disposed to face on symmetrical two sides among four sides of the light guide plate 31. The light emitting diode module 34 includes a printed circuit board 34b in a plate shape so that the light emitting diode 34a is mounted. In the embodiment of the present invention, it is exemplarily shown that the printed circuit boards 34b are formed on both side ends of the display panel 11 in a long shape in a longitudinal direction, but the aspect of the present invention is not limited thereto. For example, the printed circuit boards 34b may be disposed on symmetrical two sides among four sides of the light guide plate like as the light emitting diode to be mounted on the printed circuit board.

Light emitted by the light emitting diode module 34 is incident into the light guide plate 31. The incident light is guided in front of the light guide plate 31 by a light emitting pattern (not shown) patterned on an upper or lower surface of the light guide plate 31 and a reflective sheet 32 disposed in the rear of the light guide plate 31. The guided light is changed by the optical sheets 33 to have a more uniform brightness distribution and is applied to the display panel 11.

Meanwhile, a bottom chassis 40 is preferably formed of a high thermal conductive material so that heat generated from the light emitting diode module 34 is dissipated by the bottom chassis 40 serving as a heat sink.

In the embodiment of the present invention, it is exemplarily shown that a structure of the backlight unit 30 includes the light emitting diodes disposed on left and right sides thereof, but the aspect of the present invention is not limited thereto. For example, the detailed structure of the backlight unit may be variously changed according to design conditions of the display apparatus.

Further, the top chassis 20 disposed in front of the display panel 11 is provided to support edges of a front surface of the display panel 11 and is combined with the bottom chassis 40 disposed in the rear of the display panel 11 to form an exterior of the display module 10.

The bottom chassis 40 is formed in a rectangular plate shape with a size corresponding to the rear surface of the display panel 11, and then is provided to form a rear plate of the display panel 11 and may be simultaneously provided so that the backlight unit 30 is mounted.

Figure 3:
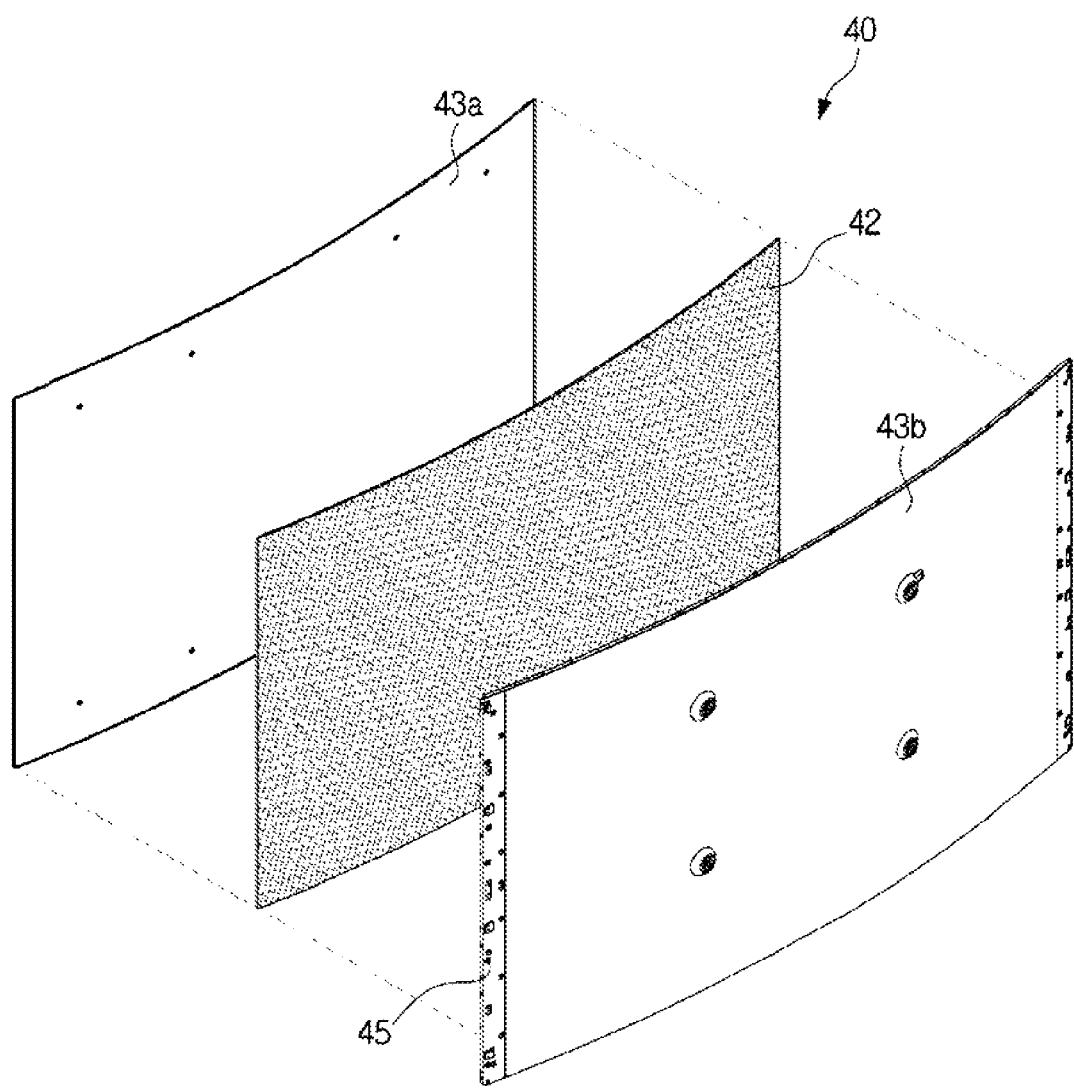
FIG. 3 is an exploded perspective view schematically showing a bottom chassis of the display apparatus in accordance with the embodiment of the present invention.
Figure 5:
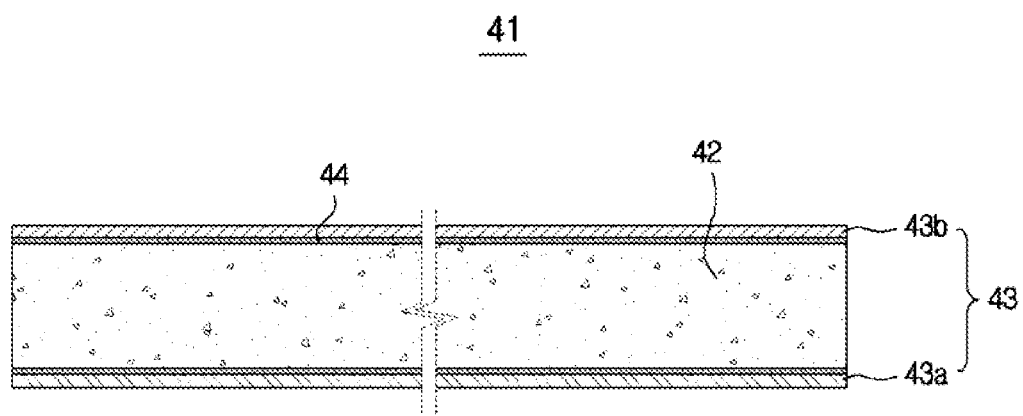
FIG. 5 is a cross sectional view showing a sandwich panel in accordance with an embodiment of the present invention.

As shown in FIGS. 3 to 5, the bottom chassis 40 of the display apparatus 1 is formed to be bent to support the rear surface of the curved display module 10.

The bottom chassis 40 may be formed in a curved shape of which both ends protrude forward compared to a center position thereof to have a predetermined curvature.

Here, the bottom chassis 40 is formed with a size corresponding to the rear surface of the display panel 11 and may be provided to accommodate the backlight unit 30.

The bottom chassis 40 is formed with a planar material 43 and a sandwich panel 41 including a plastic core 42 provided inside the planar material 43.

The bottom chassis 40 is formed with the plastic core 42 including a non-conductive heat dissipation member and the planar material 43 including a conductive heat dissipation member.

The planar material 43 may include at least one of aluminum, steel, a metal, and a fiber composite material.

The plastic core 42 may be formed of a plastic material including at least one of polypropylene (PP), polycarbonate (PC), polyethylene (PE), polyurethane (PU), polystyrene (PS), and polyvinyl chloride (PVC).

Further, the plastic core 42 may be formed of a composite including at least one of glass fibers, whiskers, and a plastic material including at least one of PP, PC, PE, PU, PS, and PVC.

Meanwhile, the plastic core 42 may include a foam which is foamed of a plastic material.

The planar material 43 is formed in at least one plate shape. The planar material 43 may include a first planar material 43a disposed on one side of the plastic core 42 and a second planar material 43b disposed on the other side thereof.

Therefore, the bottom chassis 40 may be formed with the sandwich panel 41 in which the plastic core 42 is interposed between the first planar material 43a and the second planar material 43b.

The sandwich panel 41 may further include an adhesive 44 and an adhesive film for adhesion between the first planar material 43a, the second planar material 43b, and the plastic core 42. The adhesive 44 may include an epoxy coating.

Meanwhile, at least one of the planar materials 43 forming the bottom chassis 40 includes a coupler 45 for coupling with the top chassis 20.

The bottom chassis 40 has the coupler 45 bent to be formed perpendicular to the display panel 11. The coupler 45 of the bottom chassis 40 may be coupled with the top chassis 20 by coupling units (not shown) such as screws, hooks, etc.

The above-described bottom chassis 40 coupled to the display panel 11 may quickly dissipate heat generated through the light emitting diode module 34 of the display module 10 to the outside of the display apparatus 1.

Figure 6:
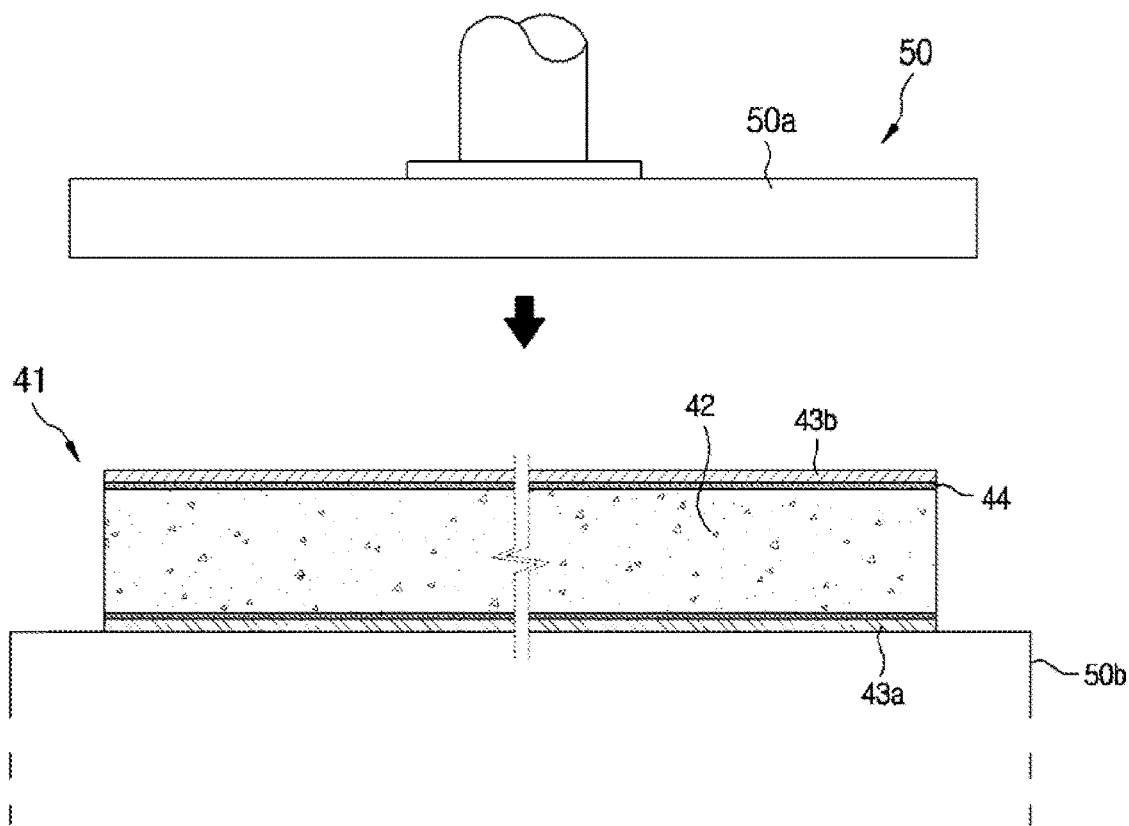
FIG. 6 is a schematic view showing a method of fabricating the sandwich panel in accordance with the embodiment of the present invention.

As shown in FIG. 6, a method of fabricating of the sandwich panel 41 forming the bottom chassis 40 is briefly described below.

A jig 50 having a first jig 50a in an upward direction and the second jig 50b in a downward direction corresponding to the first jig 50a is provided.

The first planar material 43a, the plastic core 42 and the second planar material 43b are sequentially stacked in an upward direction on the second jig 50b.

Here, the adhesive 44 may be coated between the first planar material 43a and a lower surface of the plastic core 42 and between the second planar material 43b and an upper surface of the plastic core 42.

Further, the second jig 50b moves in a downward direction and a thermal compression process may be performed.

In the embodiment of the present invention, it is exemplarily shown that the adhesive 44 is coated between the planar material 43 and the plastic core 42, but the aspect of the present invention is not limited thereto. For example, a temperature of the plastic core 42 is increased, the plastic core 42 is interposed between the first planar material 43a and the second planar material 43b, and then the sandwich panel 41 may be formed by pressing the jig.

Meanwhile, the plastic core 42 is preferably formed by a pressing process.

The sandwich panel 41 as fabricated above may be variously formed according to design conditions of the display apparatus 1 by controlling a weight reduction, heat insulating or mechanical characteristics according to the material of the plastic core 42

Further, the sandwich panel 41 may include a bead or foam form capable of enhancing the strength and hardness thereof through a pressing process.

Figure 7:
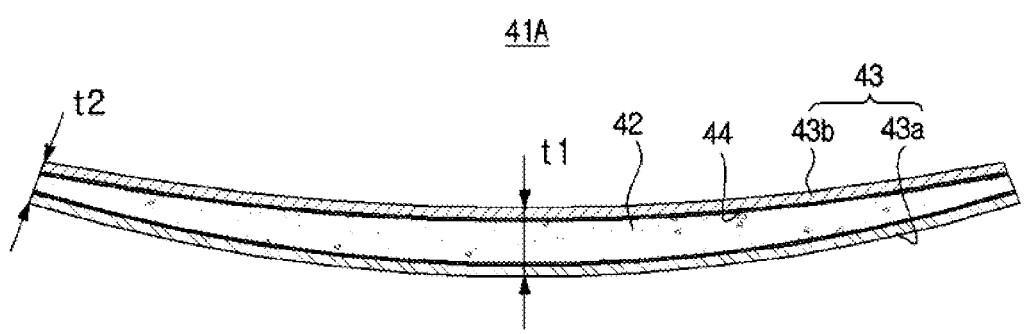
FIG. 7 is a cross sectional view illustrating a sandwich panel in accordance with another embodiment of the present invention.
Figure 8:
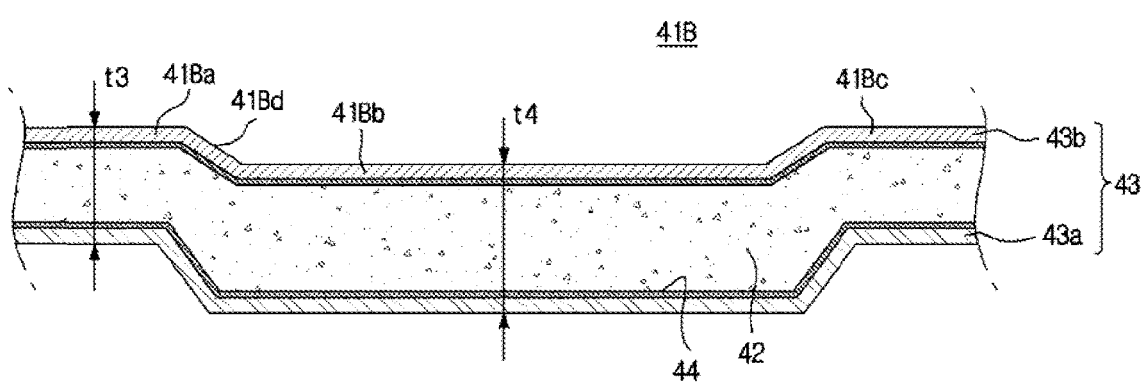
FIG. 8 is a cross sectional view illustrating a sandwich panel in accordance with still another embodiment of the present invention.

As shown in FIGS. 7 to 8, the sandwich panel 41A may be formed in a curved shape.

The curved sandwich panel 41 may be formed in a curved shape of which both ends protrude forward compared to the center position. In the embodiment of the present invention, it is exemplarily shown that the sandwich panel is formed in a curved shape of which both ends protrude forward compared to the center position, but the aspect of the invention is not limited thereto. For example, the curved sandwich panel may be formed with different curvatures at both ends.

The curved sandwich panel 41A may include the planar materials 43 disposed on outer sides of the plastic core 42, and the plastic core 42 interposed and stacked between the planar materials 43.

The planar materials 43 may include at least one of aluminum, steel, a metal, and a fiber composite material.

The plastic core 42 may be formed of a plastic material including at least one of PP, PC, PE, PU, PS, and PVC.

Further, the plastic core 42 may be formed of a composite including at least one of glass fibers, whiskers, and a plastic material including at least one of PP, PC, PE, PU, PS, and PVC.

The planar materials 43 are formed with at least one plate shape. The planar materials 43 may include the first planar material 43a disposed on one side of the plastic core 42 and the second planar material 43b disposed on the other side thereof.

The curved sandwich panel 41A may be formed with the plastic core 42 interposed between the first planar material 43a and the second planar material 43b.

Here, the curved sandwich panel 41A has a curved shape of which the center is positioned in a rear direction more than both ends thereof.

Further, the curved sandwich panel 41A in a curved shape may be formed by pressing the first planar material 43a and the second planar material 43B onto upper and lower surfaces of the plastic core 42 formed in a curved shape by a pressing process.

The curved sandwich panel 41A as fabricated above has a center thickness t1 greater than a thickness t2 of each of the both ends. In contrast, formation of the center thickness t1 smaller than the thickness t2 of each of the both ends is possible.

As shown in FIG. 8, the sandwich panel 41B may include a plurality of regions 41Ba, 41Bb, and 41Bc having different areas from each other in a single plate. For example, the sandwich panel 41B may include the first region 41Ba, the second region 41Bb connected to the first region 41Ba, and the third region 41Bc connected to the second region 41Bb.

Here, sloped surfaces 41Bd having a predetermined slope may be provided between the first region 41Ba, the second region 41Bb and the third region 41Bc. The sloped surfaces 41Bd are formed by the first region 41Ba, the second region 41Bb, and the third region 41Bc having different heights and thicknesses from each other.

That is, the first region 41Ba, the second region 41Bb, and the third region 41Bc may be located at different positions due to the sloped surfaces 41Bd.

Further, the first region 41Ba, the second region 41Bb, and the third region 41Bc may be formed to have different thicknesses t3 and t4. For example, the thickness t3 of the first region 41Ba and the third region 41Bc may be formed to be smaller than the thickness t4 of the second region 41Bb.

In the embodiment of the present invention, it is exemplarily shown that the thickness t3 of the first region 41Ba is formed smaller than the thickness t4 of the second region 41Bb, but the aspect of the invention is not limited thereto. For example, the thickness of the first region 41Ba may be formed to greater than that of the second region 41Bb.

As described above, since the sandwich panels 41, 41A, and 41B are formed to have various shapes and thicknesses, the formability of the bottom chassis 40 is enhanced.

Figure 9:
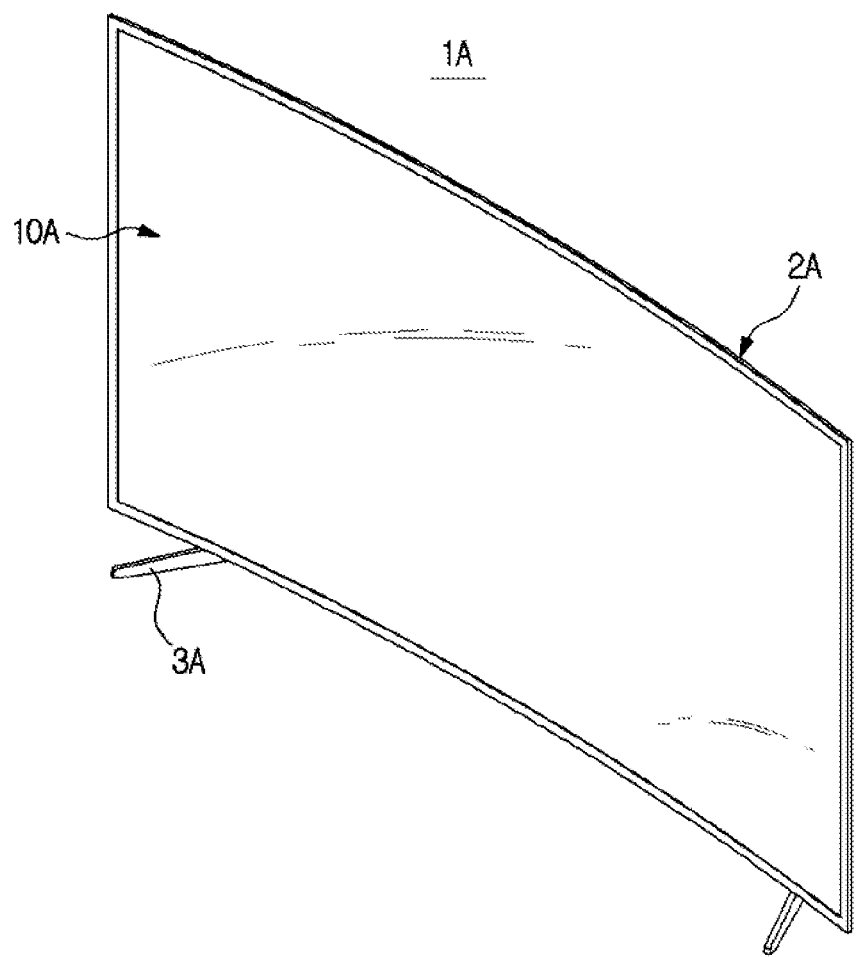
FIG. 9 is a perspective view showing a display apparatus in accordance with another embodiment of the present invention.
Figure 10:
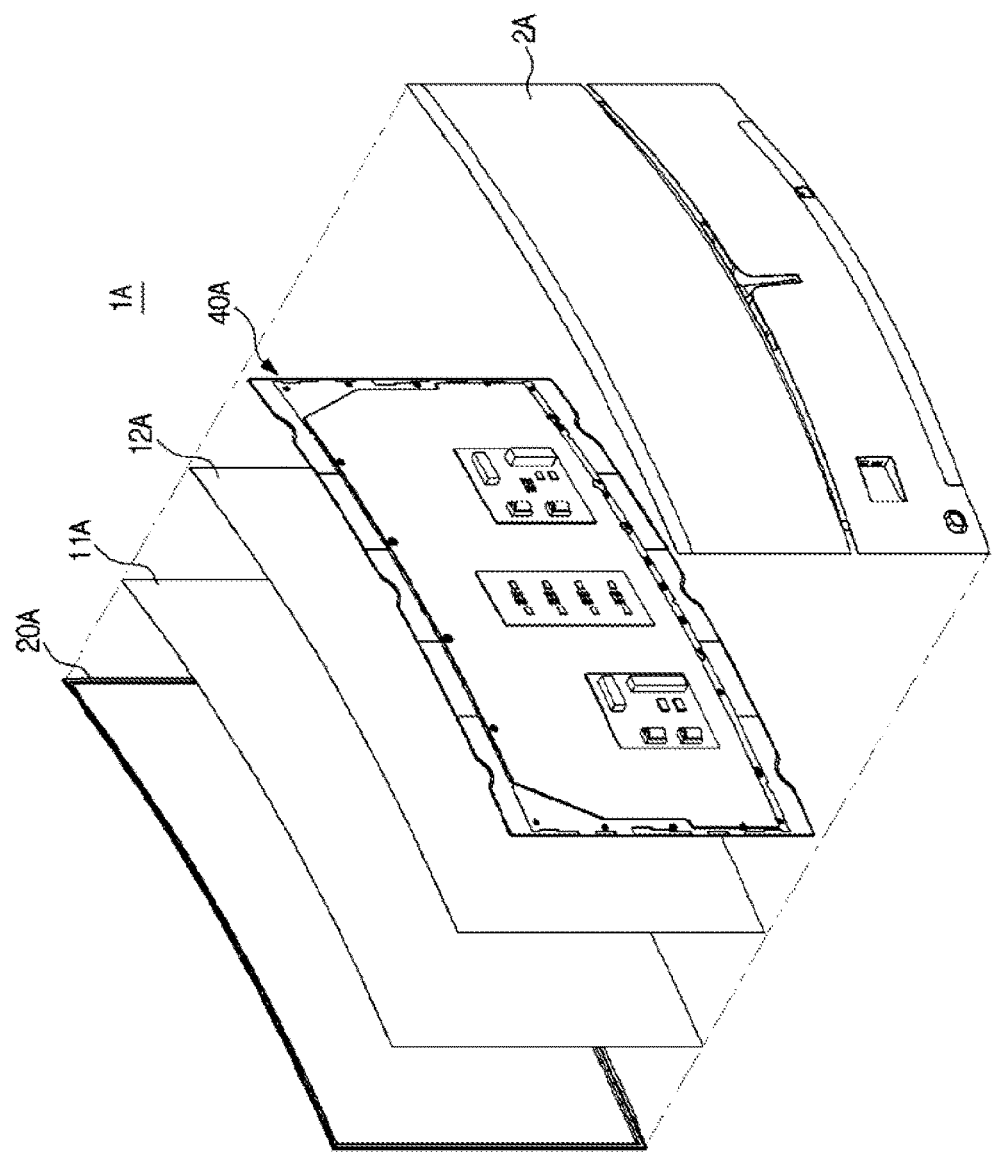
FIG. 10 is an exploded perspective view illustrating the display apparatus in accordance with another embodiment of the present invention.
Figure 11:
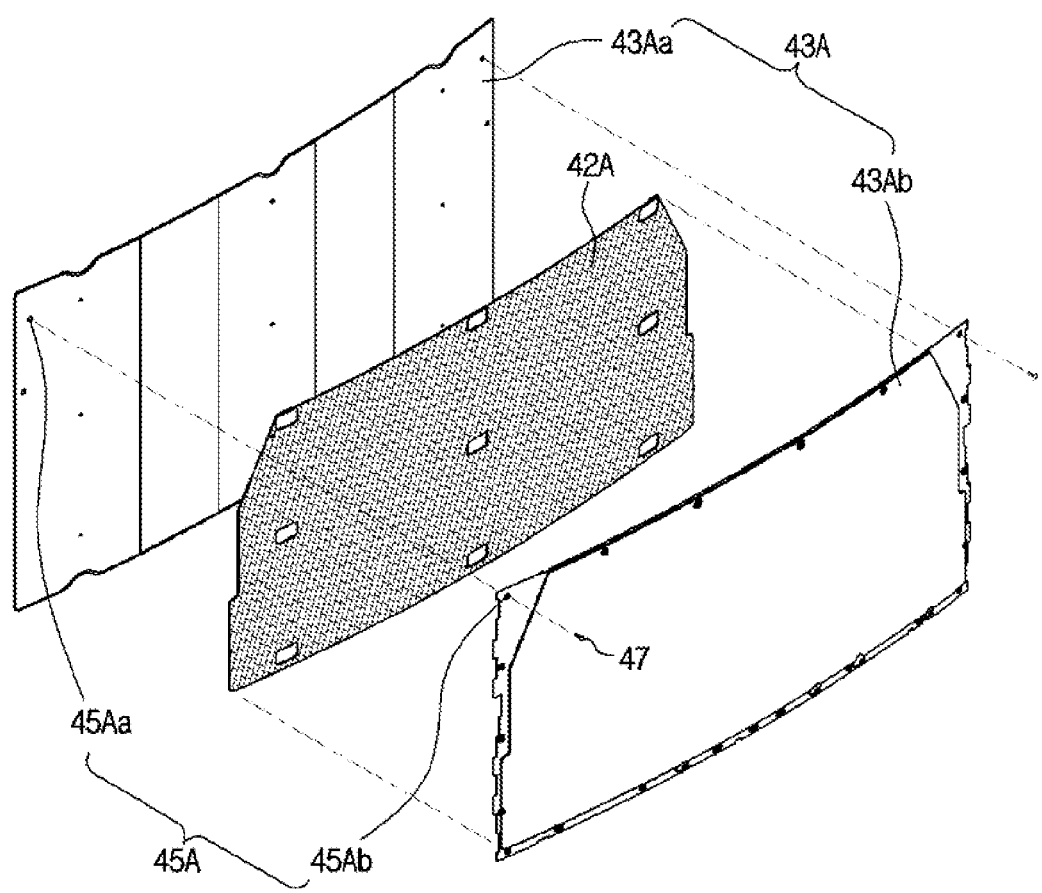
FIG. 11 is an exploded perspective view showing a bottom chassis in accordance with another embodiment of the present invention.

As shown in FIGS. 9 to 10, the display apparatus 1A according to another embodiment of the present invention includes a display module 10A having a self-emitting type display device that emits light by electrically exciting fluorescent organic compounds, such as an OLED, and a case 2A disposed on an outer side of the display module 10A which protects the display module 10A and inside electrical components.

The display module 10A includes a display panel 11A through which an image is displayed, the top chassis 20A which covers edges of a front surface of the display panel 11A, and the bottom chassis 40A which supports a rear surface of the display panel 11A.

The display panel 11A is formed with the organic light emitting diode panel and the organic light emitting diode panel is easily bent because it is formed with a flexible film form.

The top chassis 20A may support the edges of the front surface of the display panel 11A so that the display panel 11A maintains in a state installed on the bottom chassis 40A.

A heat dissipating sheet 12A may be installed on the rear surface of the display panel 11A to quickly disperse and dissipate heat generated from the display panel 11A.

Meanwhile, the bottom chassis 40A may be disposed between the rear surface of the display panel 11A and the case 2A.

The bottom chassis 40A may be formed in a smaller size than the display panel 11A to correspond to at least a portion of the rear surface of the display panel 11A.

The bottom chassis 40A may include a planar materials 43A disposed on outer sides of a plastic core 42A and the plastic core 42A interposed and stacked between the planar materials 43A.

The planar materials 43 may include at least one of aluminum, steel, a metal, and a fiber composite material.

The plastic core 42A may be formed of a plastic material including at least one of PP, PC, PE, PU, PS, PVC. The plastic core 42A may be formed of a composite including at least one of glass fibers, whiskers, and a plastic material including at least one of PP, PC, PE, PU, PS, and PVC.

The planar materials 43A are formed with at least one plate shape. The planar materials 43A may include the first planar material 43Aa disposed on one side of the plastic core 42A and the second planar material 43Ab disposed on the other side thereof.

The curved sandwich panel may be formed with the plastic core 42A interposed between the first planar material 43Aa and the second planar material 43Ab.

The first planar material 43Aa and the second planar material 43Ab have a size corresponding to the rear surface of the display panel 11A.

Fixing holes 45A may be formed in edges of the first planar material 43Aa and the second planar material 43Ab for coupling with each other. The fixing holes 45A may include at least one first fixing hole 45Aa formed to be separated by predetermined intervals in the edges of the first planar material 43Aa and at least one second fixing hole 45Ab formed in edges of the second planar material 43Ab to corresponding to the first fixing hole 45Aa.

Here, the plastic core 42A may be formed smaller than the first planar material 43Aa and the second planar material 43Ab.

Therefore, the plastic core 42A is disposed between the first planar material 43Aa and the second planar material 43ab and the bottom chassis 40A may be formed with the sandwich panel coupled by a fixing member 47 which passes through the first fixing hole 45Aa and the second fixing hole 45Ab in the edges of the first planar material 43Aa and the second planar material 43Ab.

In the embodiment of the invention, it is exemplarily shown that the plastic core 42A and the sandwich panel is formed by coupling the first planar material 43Aa and the second planar material 43Ab by the fixing member 47, but the aspect of the present is not limited thereto. For example, the planar material 43A and the plastic core 42A may be adhered by an adhesive.

Figure 12:
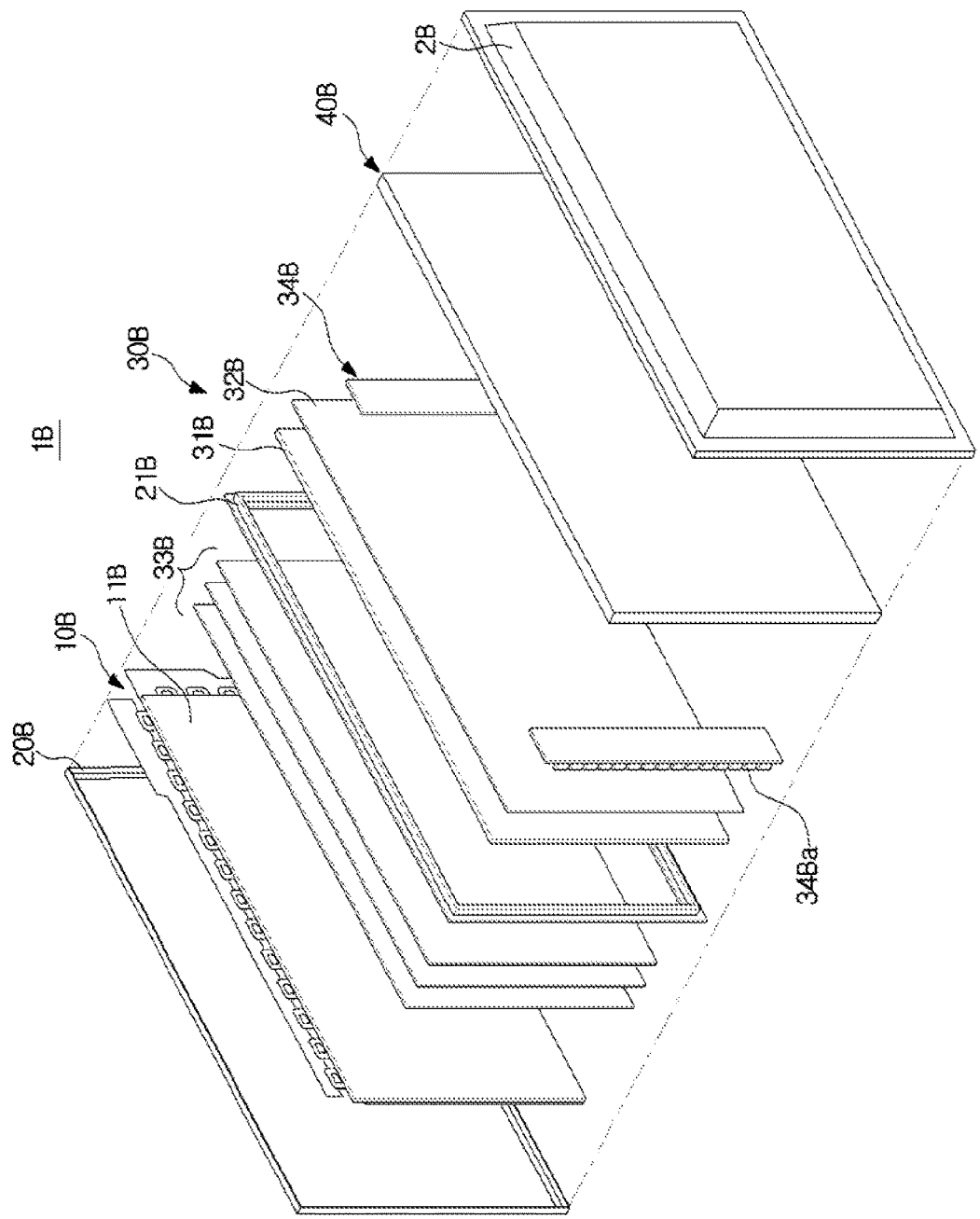
FIG. 12 is an exploded perspective view illustrating a display apparatus in accordance with still another embodiment of the present invention.
Figure 13:
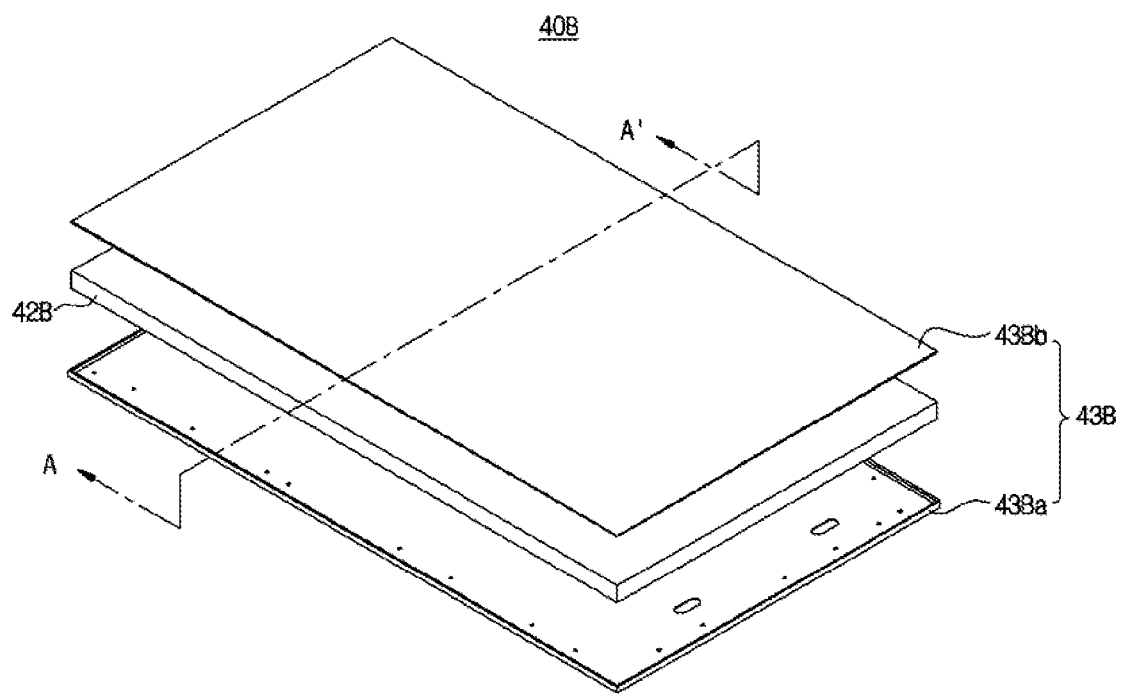
FIG. 13 is an exploded perspective view showing a bottom chassis in accordance with still another embodiment of the present invention.
Figure 14:
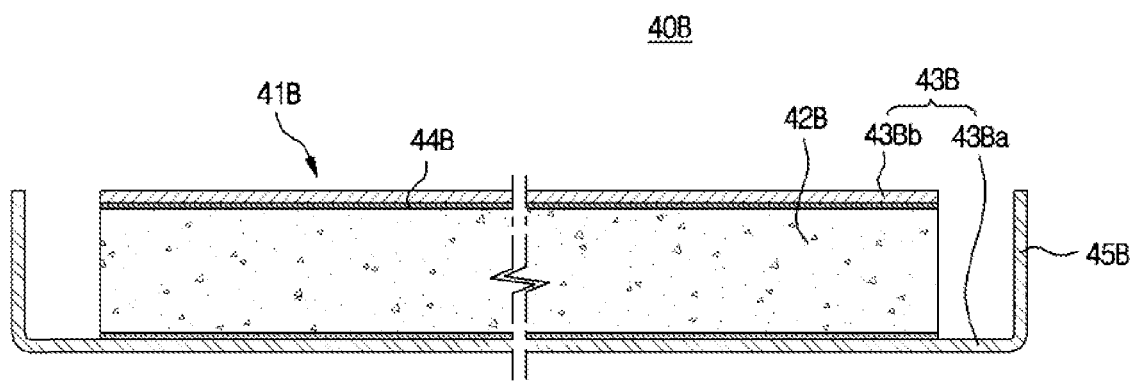
FIG. 14 is a cross sectional view showing the bottom chassis in accordance with still another embodiment of the present invention.

As shown in FIGS. 12 to 14, a display apparatus 1B in accordance with another embodiment of the present invention includes a display module 10B for displaying image information, and a case 2B disposed on outer sides of a display module 10B and provided to protect the display module 10B and inside electrical components.

The case 2B is disposed to cover a rear surface of the display module 10B. The case 2B may be detachably coupled with the display module 10B.

The display module 10B may include a display panel 11B formed with a liquid crystal panel, a backlight unit 30B separately disposed in the rear of the display panel 11B and provided so that light thereof is incident to the display panel 11B, a middle mold frame 21B which supports the display panel 11B and the backlight unit 30B components to be spaced apart from each other, a top chassis 20B and a bottom chassis 40B respectively disposed in front of the display panel 11 and in the rear of the backlight unit 30B.

The display panel 11B may be formed with a plate in a planar shape.

The display panel 11B may form images by controlling the orientation of a liquid crystal layer, but may display images using light provided by the backlight unit 30B disposed on the rear surface of the display panel 11B due to no self-emitting.

The backlight unit 30B is formed to include a plurality of optical sheets 33B disposed in the rear of the display panel 11B, a light guide plate 31B disposed in the rear of the optical sheet 33B, a reflective sheet 32B disposed on the rear surface of the light guide plate 31B, a light emitting diode module 34B for supplying light to the light guide plate 31B.

The bottom chassis 40B is disposed in the rear of the backlight unit 30B and may be formed to accommodate the backlight unit 30B.

The bottom chassis 40B may include planar materials 43B disposed on outer sides of the plastic core 42B and a plastic core 42B interposed and stacked between the planar materials 43B.

The planar material 43B may include at least one of aluminum, steel, a metal, and a fiber composite material.

The plastic core 42B may be formed of a plastic material including at least one of PP, PC, PE, PU, PS, and PVC. The plastic core 42B may be formed of a composite including at least one of glass fibers, whiskers, and a plastic material including at least one of PP, PC, PE, PU, PS, and PVC.

The planar materials 43B are formed with at least one plate shape. The planar materials 43B may include the first planar material 43Ba disposed on the front surface of the plastic core 42B and the second planar material 43Bb on the rear surface of the plastic core 42B.

The curved sandwich panel may be formed with the plastic core 42B interposed between the first planar material 43Ba and the second planar material 43Bb.

Here, the sandwich panel may be formed by a pressing process. The planar materials 43B and the plastic core 42B may be adhered by an adhesive.

The adhesive 44B adhering the first planar material 43Ba, the second planar material 43Bb, and the plastic core 42B may include an epoxy coating.

Further, the bottom chassis 40B has a coupler 45B formed to be bent perpendicular to the display panel 11B. The coupler 45B is formed to protrude in a direction of the display panel 11B, that is, in a front direction, and may be assembled with the top chassis 20B by coupling units (not shown) such as screws, hooks, etc.

In an aspect of the present invention, the display apparatus can be slim and lightweight by the chassis having the sandwich structure to which the plastic core is applied.

Further, the display apparatus has an advantage for securing the strength and hardness of the bottom chassis.

Furthermore, while the display apparatus is assembled, heat generated in circuitry disposed on the rear surface of the display apparatus is prevented from being delivered to the display unit of the display panel, and light leakage caused by cell deformation by the heat is prevented, and thus the quality of a product can be enhanced.

Any combinations of one or more of the described features, elements, materials, components, functions, and/or benefits can be provided. Although a few embodiments of the present invention have been shown and described, it would be appreciated by those skilled in the art that changes may be made in these embodiments and without departing from the principles and spirit of the invention, the scope of which is defined in the claims and their equivalents.

What is claimed is:

1. A display apparatus comprising:
a display panel configured to display an image;
a case forming an outer surface of the display apparatus; and
a bottom chassis forming a rear side of the display panel inside the case,
wherein the bottom chassis is formed with a stacked panel having a stacked structure, the stacked structure including:
a plastic core,
first and second planar materials respectively disposed on the opposite sides of the plastic core, and
an adhesive or an adhesive film on the opposite sides of the plastic core for attaching the first and second planar materials.

2. The display apparatus according to claim 1, wherein the bottom chassis is formed to have a size corresponding to at least a portion of the rear side of the display panel.

3. The display apparatus according to claim 1, wherein the bottom chassis is formed to have a size corresponding to the rear side of the display panel.

4. The display apparatus according to claim 1, wherein the first and second planar materials include at least one or any combination of aluminum, steel, a metal, and a fiber composite material.

5. The display apparatus according to claim 1, wherein the plastic core is a plastic material including at least one or any combination of polypropylene, polycarbonate, polyethylene, polyurethane, polystyrene, and polyvinyl chloride.

6. The display apparatus according to claim 1, wherein the plastic core is formed of a composite including at least one or any combination of a plastic material, glass fibers, and whiskers.

7. The display apparatus according to claim 1, wherein the stacked panel is processed by at least one method or any combination of methods of adhesion, a jig and thermal compression.

8. The display apparatus according to claim 1, further comprising a backlight unit provided so that light thereof is incident to the display panel,
wherein the bottom chassis is provided to accommodate the backlight unit in a rear side of the backlight unit.

9. The display apparatus according to claim 1, wherein the stacked panel includes at least one or any combination of a planar shape and a curved shape.

10. The display apparatus according to claim 1, wherein the stacked panel includes at least one or any combination of regions having different areas from each other, wherein the regions are formed to have different thicknesses from each other.

11. A display apparatus comprising:
a display panel;
a case forming an outer surface of the display apparatus;
a backlight unit configured to supply light to the display panel; and
a bottom chassis forming a rear side of the display panel inside the case so that the backlight unit is accommodated inside the case,
wherein the bottom chassis is formed with at least one planar material that is a conductive type, a panel including a plastic core that is a non-conductive type and stacked on the planar material, and an adhesive or an adhesive film on the plastic core for attaching the at least one planar material.

12. The display apparatus according to claim 11, wherein the bottom chassis is formed to have a size corresponding to the display panel on the rear side of the display panel.

13. The display apparatus according to claim 11, wherein the planar material includes at least one or any combination of aluminum, steel, a metal, and a fiber composite material.

14. The display apparatus according to claim 11, wherein the plastic core is formed of a composite configured to include at least one or any combination of a plastic material, glass fibers, and whiskers.

15. The display apparatus according to claim 11, wherein the panel is processed by at least one method or any combination of methods of adhesion, a jig and thermal compression.

16. The display apparatus according to claim 11, wherein the panel includes a curved shape having a predetermined curvature to support the display panel in a curved state.

17. The display apparatus according to claim 16, wherein the panel in the curved shape is formed so that a thickness thereof is gradually increased from both ends thereof toward a center thereof.

18. A display apparatus comprising:
a display panel configured to display an image;
a case forming an outer surface of the display apparatus;
a bottom chassis forming a rear side of the display panel inside the case, the bottom chassis being formed to have a size corresponding to at least a portion of the display panel,
wherein the bottom chassis includes a plastic core of a plastic material including at least one or any combination of polypropylene, polycarbonate, polyethylene, polyurethane, polystyrene, and polyvinyl chloride, a panel having a planar material stacked on a side of the plastic core corresponding to the portion of the rear side of the display panel, and an adhesive or an adhesive film on a side of the plastic core for attaching the planar material.

19. The display apparatus according to claim 18, wherein the planar material includes at least one or any combination of aluminum, steel, a metal, and a fiber composite material.

20. The display apparatus according to claim 18, wherein the plastic core is formed of a composite including at least one or any combination of a plastic material, glass fibers, and whiskers.

21. The display apparatus according to claim 20, wherein the panel further includes a fixing member for fixing between the planar material and the plastic core.

22. The display apparatus according to claim 18, wherein the panel is processed by at least one method or any combination of methods of adhesion, a jig or thermal compression.

* * * * *